United States Patent
Watanabe

(10) Patent No.: US 12,205,300 B2
(45) Date of Patent: Jan. 21, 2025

(54) IMAGING DEVICE, ELECTRONIC DEVICE, AND IMAGING METHOD

(71) Applicant: C/O SONY SEMICONDUCTOR SOLUTIONS CORPORATION, Kanagawa (JP)

(72) Inventor: Goshi Watanabe, Kanagawa (JP)

(73) Assignee: C/O SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 382 days.

(21) Appl. No.: 17/429,867

(22) PCT Filed: Jan. 20, 2020

(86) PCT No.: PCT/JP2020/001629
§ 371 (c)(1),
(2) Date: Aug. 10, 2021

(87) PCT Pub. No.: WO2020/170670
PCT Pub. Date: Aug. 27, 2020

(65) Prior Publication Data
US 2022/0108457 A1  Apr. 7, 2022

(30) Foreign Application Priority Data

Feb. 19, 2019  (JP) ................. 2019-027847

(51) Int. Cl.
*G06T 7/20* (2017.01)
*H04N 5/91* (2006.01)
*H04N 23/63* (2023.01)

(52) U.S. Cl.
CPC ............... *G06T 7/20* (2013.01); *H04N 5/91* (2013.01); *H04N 23/632* (2023.01);
(Continued)

(58) Field of Classification Search
CPC ............ G06T 7/20; G06T 2207/10016; G06T 2207/20084; G06T 2207/20104;
(Continued)

(56) References Cited

U.S. PATENT DOCUMENTS 10,582,125 B1 * 3/2020 Roessler ................ H04N 23/45
12,079,914 B2 * 9/2024 Wang ....................... G06T 7/70
(Continued)

FOREIGN PATENT DOCUMENTS

CN  1496110 A  5/2004
CN  1905629 A  1/2007
(Continued)

OTHER PUBLICATIONS

International Search Report and Written Opinion of PCT Application No. PCT/JP2020/001629, issued on Feb. 18, 2020, 11 pages of ISRWO.

*Primary Examiner* — Amy R Hsu
(74) *Attorney, Agent, or Firm* — CHIP LAW GROUP

(57) ABSTRACT

To provide an imaging device and an electronic device capable of capturing a motion of a subject at a moment desired by a user in the motions of the subject. A CIS (2) and an electronic device (1), which are examples of an imaging device according to the present disclosure, include an imaging unit (5), a memory (6), a detection unit (82), and an erasing unit (83). The imaging unit (5) continuously captures images of the subject to generate image data. The memory (6) stores image data. The detection unit (82) detects the amount of motion of the subject based on the image data in time series. The erasing unit (83) erases image data in which the amount of motion of the subject is less than a predetermined amount of motion.

14 Claims, 6 Drawing Sheets

(52) U.S. Cl.
CPC ............... *G06T 2207/10016* (2013.01); *G06T 2207/20084* (2013.01); *G06T 2207/20104* (2013.01); *G06T 2207/30196* (2013.01)

(58) Field of Classification Search
CPC ............. G06T 2207/30196; G06T 7/33; G06T 2207/20081; G06T 2207/30221; H04N 5/91; H04N 23/632; H04N 23/60; H04N 23/62; H04N 5/772; G03B 7/091; G03B 15/00
See application file for complete search history.

(56) References Cited

U.S. PATENT DOCUMENTS

| | | | |
|---|---|---|---|
| 2004/0095477 A1* | 5/2004 | Maki | H04N 19/14 348/222.1 |
| 2006/0115297 A1 | 6/2006 | Nakamaru | |
| 2009/0195689 A1* | 8/2009 | Hwang | G03B 13/36 348/E5.022 |
| 2009/0295931 A1 | 12/2009 | Cho | |
| 2011/0141319 A1* | 6/2011 | Watazawa | H04N 23/611 348/240.2 |
| 2011/0279691 A1 | 11/2011 | Ishii | |
| 2012/0002067 A1 | 1/2012 | Fukata | |
| 2012/0242851 A1* | 9/2012 | Fintel | H04N 23/64 348/221.1 |
| 2014/0105463 A1* | 4/2014 | Wang | G06T 7/269 382/103 |
| 2015/0070526 A1 | 3/2015 | Kinoshita | |
| 2016/0335611 A1* | 11/2016 | Wang | H04L 41/22 |
| 2018/0167565 A1* | 6/2018 | Abe | G06T 7/11 |
| 2018/0188045 A1 | 7/2018 | Wheeler et al. | |
| 2018/0199806 A1* | 7/2018 | Dziubak | G06T 11/005 |
| 2018/0330183 A1 | 11/2018 | Tsunoda | |
| 2019/0174056 A1* | 6/2019 | Jung | H04N 23/632 |
| 2019/0246075 A1* | 8/2019 | Khadloya | G06V 40/10 |
| 2019/0325269 A1* | 10/2019 | Bagherinezhad | G06F 18/241 |
| 2020/0380697 A1 | 12/2020 | Nakagawa | H04N 23/60 |
| 2021/0081093 A1* | 3/2021 | Yun | G06F 3/04842 |
| 2021/0314486 A1* | 10/2021 | Hasegawa | H04N 23/53 |
| 2022/0172827 A1* | 6/2022 | Endo | G16H 50/20 |

FOREIGN PATENT DOCUMENTS

| | | | |
|---|---|---|---|
| CN | 101491083 A | 7/2009 | |
| CN | 101860674 A | 10/2010 | |
| CN | 104205798 A | 12/2014 | |
| CN | 105323456 A | 2/2016 | |
| CN | 108388886 A | 8/2018 | |
| CN | 108765404 A | 11/2018 | |
| EP | 2838253 A1 | 2/2015 | |
| EP | 3563265 A1 | 11/2019 | |
| JP | 2004-072655 A | 3/2004 | |
| JP | 2005277724 A | 10/2005 | |
| JP | 2006-157428 A | 6/2006 | |
| JP | 2009157242 A * | 7/2009 | |
| JP | 2012-147355 A | 8/2012 | |
| JP | 2013-146017 A | 7/2013 | |
| JP | 2015115899 A | 6/2015 | |
| JP | 2016213548 A | 12/2016 | |
| JP | 2018124780 A * | 8/2018 | ........... G06F 3/1243 |
| WO | 2013/153883 A1 | 10/2013 | |
| WO | 2018/126215 A1 | 7/2018 | |

\* cited by examiner

IMAGING DEVICE, ELECTRONIC DEVICE, AND IMAGING METHOD

CROSS REFERENCE TO RELATED APPLICATIONS

This application is a U.S. National Phase of International Patent Application No. PCT/JP2020/001629 filed on Jan. 20, 2020, which claims priority benefit of Japanese Patent Application No. JP 2019-027847 filed in the Japan Patent Office on Feb. 19, 2019. Each of the above-referenced applications is hereby incorporated herein by reference in its entirety.

FIELD

The present disclosure relates to an imaging device, an electronic device, and an imaging method.

BACKGROUND

There is an imaging device having a continuous imaging function capable of capturing a moving subject, specifically capturing a motion of the subject at a moment desired by the user in the motions of the subject, by continuously imaging the moving subject at high speed. For example, Patent Literature 1 describes an imaging device that controls to perform continuous imaging at a frame speed higher than a current frame speed when it is determined that an operation unit for continuous imaging is being pressed by the user and that controls to maintain the current frame speed when it is determined that the operation unit is not being pressed.

CITATION LIST

Patent Literature

Patent Literature 1: JP 2012-147355 A

SUMMARY

Technical Problem

However, there are cases where the imaging device cannot image the motion of the subject at a moment desired by the user in the motions of the subject when performing high speed continuous imaging. Therefore, the present disclosure proposes an imaging device, an electronic device, and an imaging method capable of imaging a motion of a subject at a moment desired by the user in the motions of the subject.

Solution to Problem

An imaging device according to the present disclosure includes an imaging unit, a memory, a detection unit, and an erasing unit. The imaging unit continuously captures images of the subject to generate image data. The memory stores image data. The detection unit detects the amount of motion of the subject based on the image data in time series. The erasing unit erases image data in which the amount of motion of the subject is less than a predetermined amount of motion.

DESCRIPTION OF EMBODIMENTS

Embodiments of the present disclosure will be described below in detail with reference to the drawings. In each of the following embodiments, the same parts are denoted by the same reference symbols, and a repetitive description thereof will be omitted.

1. Configuration of Electronic Device

Figure 1:
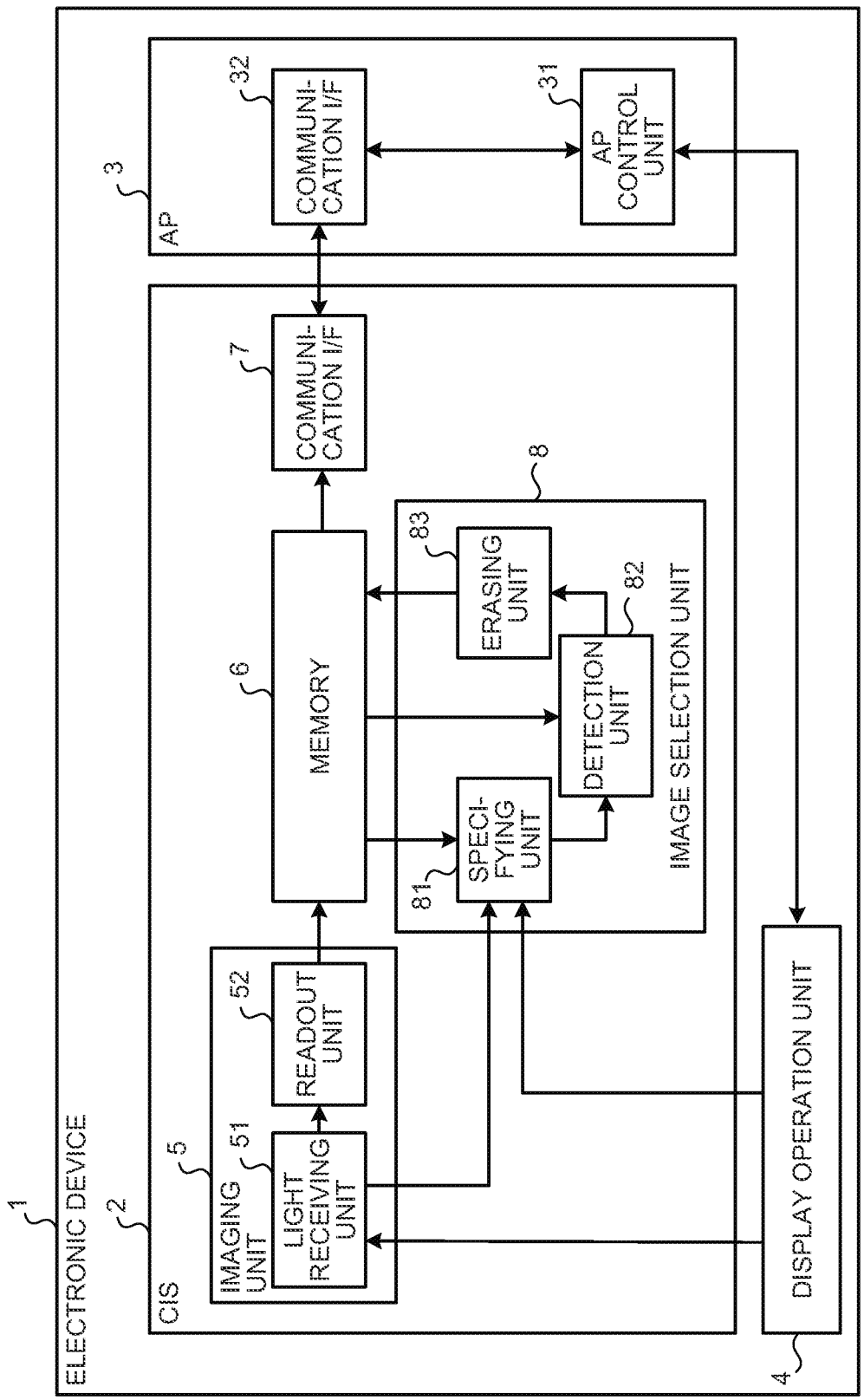
FIG. 1 is a block diagram illustrating a schematic configuration example of an electronic device according to the present disclosure.

FIG. 1 is a block diagram illustrating a schematic configuration example of an electronic device according to the present disclosure. An electronic device 1 illustrated in FIG. 1 is a device that captures a still image or a moving image, and an example this includes a digital camera and a digital video camera, or a tablet terminal, a smartphone, or the like, having a camera function.

As illustrated in FIG. 1, the electronic device 1 includes a Complementary Metal Oxide Semiconductor (CMOS) image sensor (hereinafter referred to as a CIS 2), an application processor (hereinafter referred to as an AP 3), and a display operation unit 4.

The display operation unit 4 is a touch panel liquid crystal display having a function of displaying an image and a function of receiving touch operations by a user. Alternatively, the electronic device 1 may include: a liquid crystal display for displaying an image; and an operation switch for receiving touch operations by the user, instead of the display operation unit 4.

As an example of an imaging device having a one-chip configuration, the CIS 2 captures an image, and outputs image data of the captured image to the AP 3. In addition to the function of capturing a normal still image or moving image, the CIS 2 has a high speed imaging function of continuously imaging a subject at high speed (hereinafter referred to as high speed imaging). The imaging device according to the present disclosure is not limited to the CIS 2, and may be other image sensors such as a Charge Coupled Device (CCD) image sensor.

The AP 3 includes: an AP control unit 31 which is an example of a processor such as a Central Processing Unit (CPU) that executes various application programs according to applications of the electronic device 1; and a communication interface (I/F) 32 that performs information communication with the CIS 2.

The AP 3 performs, for example, correction processing and modification processing on the image data input from the CIS 2, as well as performing display control processing for displaying image data on the display operation unit 4. In addition, by controlling to display the image data of the captured image captured at high speed by the CIS 2 on the display operation unit 4 in time series, the AP 3 can perform super slow playback of the motion of the subject moving at high speed.

Here, when a camera equipped on a general electronic device such as a smartphone performs high speed imaging, the CIS continuously images the subject at high speed, and stores image data of the captured images in the memory in time series.

Unfortunately, however, an electronic device has an upper limit on the capacity of the memory for storing image data. For this reason, there might be a case, in a general electronic device, for example, where the amount of image data of the captured image reaches the upper limit of the capacity of the memory before arrival of a moment desired by the user in the motions of the subject when the user's operation timing of starting high speed imaging is too early.

In such a case, even when the image data captured at high speed is played back on the electronic device at super slow speed, the playback of the image at a moment desired by the user in the motions of the subject might be difficult because image data capturing the motion at the moment desired by the user in the motions of the subject is not stored in the memory. In this manner, there is a case where capturing the motion of the subject at the moment desired by the user in the motions of the subject is not possible with a general electronic device.

Therefore, the CIS 2 according to the present disclosure has a configuration capable of capturing the motion of the subject at a moment desired by the user even when the user's operation for starting high speed imaging is too early. Specifically, the CIS 2 includes an imaging unit 5, a memory 6, a communication I/F 7, and an image selection unit 8.

The imaging unit 5 includes a light receiving unit 51 and a readout unit 52. The light receiving unit 51 includes: an optical system equipped with a zoom lens, a focus lens, an aperture, or the like; and a pixel array unit having a configuration in which unit pixels including light receiving elements such as photodiodes are arranged in a two-dimensional matrix, for example.

The light receiving unit 51 uses the optical system to form an image of light incident from the outside, on a light receiving surface of the pixel array unit. By performing photoelectronic conversion of the light incident on the light receiving element, each of unit pixels of the pixel array unit readably accumulates the electric charge corresponding to the amount of the incident light.

The readout unit 52 includes: a readout circuit that reads out the electric charge accumulated in each of the unit pixels as a pixel signal; and an Analog to Digital Converter (ADC) that generates digital image data by converting an analog pixel signal read out by the readout circuit, into a digital value. The readout unit 52 outputs the generated image data to the memory 6 in units of one frame of images.

The imaging unit 5 has an autofocus (AF) function. When focusing (focus point setting) is achieved on a subject by the AF function, the imaging unit 5 outputs information indicating the position of the focus point in the captured image to the image selection unit 8.

When a signal indicating that the imaging operation has been performed by the user is input from the display operation unit 4, the imaging unit 5 captures a still image or a moving image. Furthermore, the imaging unit 5 starts high speed imaging when it has received a signal (hereinafter, referred to as a high speed imaging trigger) indicating that the user has performed a high speed imaging start operation on the display operation unit 4.

The memory 6 is a storage device such as a flash memory, for example, and stores in time series the image data representing the captured images input from the imaging unit 5. Having received an image data acquisition request from the AP 3, the communication I/F 7 outputs the image data stored in the memory 6 to the AP 3.

The AP control unit 31 outputs the image data input from the CIS 2 via the communication I/F 32, to the display operation unit 4 so as to display the image data. For example, when the display operation unit 4 has received an image display operation by the user, the AP control unit 31 outputs an image data acquisition request to the CIS 2 via the communication I/F 32, acquires the image data from the CIS 2 so as to display it on the display operation unit 4.

The image selection unit 8 includes, for example, a microcomputer having a Central Processing Unit (CPU), a Read Only Memory (ROM), a Random Access Memory (RAM) or the like, and various circuits.

The image selection unit 8 includes: a specifying unit 81, a detection unit 82; and an erasing unit 83, configured to function by execution, by the CPU, programs stored in the ROM using RAM as a work area. Note that the specifying unit 81, the detection unit 82, and the erasing unit 83 included in the image selection unit 8 may be partially or entirely formed with hardware devices such as an Application Specific Integrated Circuit (ASIC) or a Field Programmable Gate Array (FPGA).

The specifying unit 81, the detection unit 82, and the erasing unit 83 included in the image selection unit 8 individually execute the information processes described below. The internal configuration of the image selection unit 8 is not limited to the configuration illustrated in FIG. 1, and may be another configuration as long as it is a configuration that performs information processing described below.

The specifying unit 81 reads out image data from the memory 6 and specifies a subject in the image based on the image data. For example, before the high speed imaging performed by the imaging unit 5 is started, the specifying unit 81 specifies a subject based on the image data of a preview image captured by the imaging unit 5. The preview image is continuously displayed on the display operation unit 4 until high speed imaging is started.

The specifying unit 81 determines the composition of the image by Deep Neural Network (DNN) processing using a DNN and then decides a Region of Interest (ROI) region in which a subject is imaged, from the determined composition, and thereby specifies the subject. Subsequently, the specifying unit 81 outputs information indicating the position of the ROI region in the image in which the subject is specified, to the detection unit 82.

Incidentally, the specifying unit 81 can specify the subject by using various neural networks other than the DNN, such as a Recurrent Neural Network (RNN) and a Convolutional Neural Network (CNN). Furthermore, the specifying unit 81 may be configured to specify the subject by using a learning model trained by various other machine learning such as a decision tree or a support vector machine.

When high speed imaging is started, the detection unit 82 reads out the image data of the time-series high speed captured image from the memory 6, and detects the amount of motion of the subject between the pieces of the image data in time series based on the information indicating the position of the ROI region input from the specifying unit 81.

That is, the detection unit 82 detects the amount of motion of the subject in the ROI region in each of the time-series high speed captured images. Subsequently, the detection unit 82 outputs the image data of each of the high speed captured images in which the amount of motion of the subject has been detected, together with the information indicating the amount of motion of the subject, to the erasing unit 83.

Among the image data input from the detection unit 82, the erasing unit 83 erases the image data in which the amount of motion of the subject is less than a predetermined amount of motion. Furthermore, among the image data input from the detection unit 82, the erasing unit 83 re-stores the image in which the amount of motion of the subject is a predetermined amount of motion or more, to the memory 6.

Furthermore, as described above, the specifying unit 81 specifies a subject based on a preview image before the high speed imaging is started. Therefore, the erasing unit 83 can select the image data immediately after the start of high speed imaging.

In this manner, by effectively utilizing a storage region of the memory 6 which becomes a free region by erasing the image data of the image in which the amount of motion of the subject is less than a predetermined amount of motion, the CIS 2 is capable of extending the time usable for high speed imaging. This enables the CIS 2 to capture the motion of the subject at a moment desired by the user in the motions of the subject, even when the user's operation for starting high speed imaging is too early.

2. Operations of Electronic Device

Figure 2:
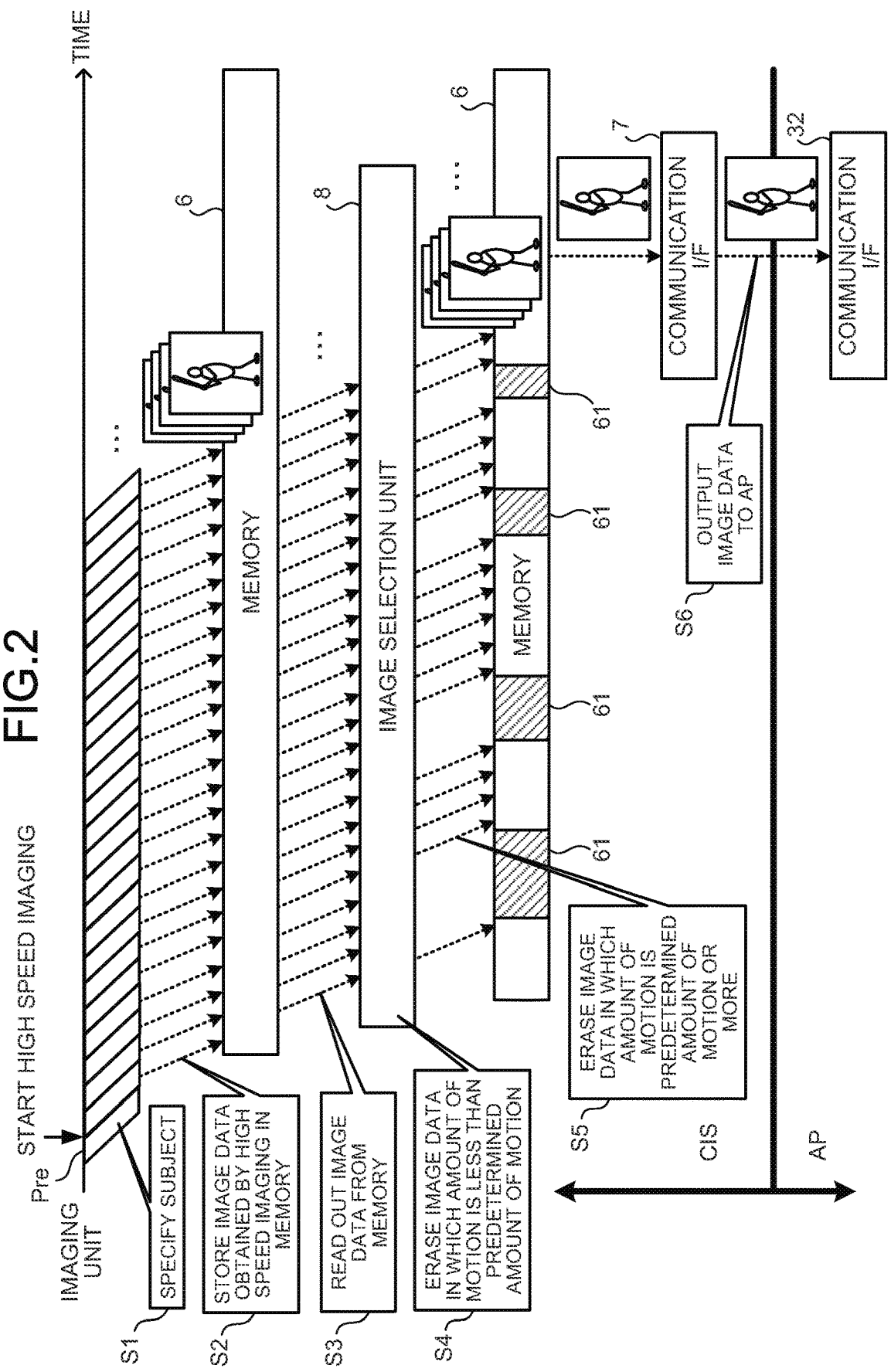
FIG. 2 is an operation diagram of a CIS according to the present disclosure.

Next, operations of the CIS according to the present disclosure will be described with reference to FIG. 2. FIG. 2 is an operation diagram of the CIS according to the present disclosure. Although FIG. 2 illustrates two memories 6 to simplify the operations of the CIS 2, the two memories 6 in FIG. 2 are physically identical.

As illustrated in FIG. 2, before starting high speed imaging, the CIS 2 initially specifies a subject from a preview image Pre by the image selection unit 8 (step S1). Thereafter, having started high speed imaging, the CIS 2 outputs the image data obtained in the high speed imaging from the imaging unit 5 to the memory 6 so as to store the image data in the memory 6 (step S2).

Subsequently, the image selection unit 8 reads out the image data from the memory 6 (step S3). Subsequently, the image selection unit 8 erases the image data in which the amount of motion of the subject is less than a predetermined amount of motion (step S4). Thereafter, the image selection unit 8 stores the image data in which the amount of motion of the subject is a predetermined amount of motion or more, to the memory 6 (step S5).

This allows the memory 6 to have a free region 61 in the region where the image data erased in step S4 has been stored. By using the free region 61 of the memory 6, the CIS 2 can continue the high speed imaging.

With this configuration, the CIS 2 can extend the duration of high speed imaging as compared with a case where the image data is not deleted (thinned out) by the image selection unit 8. Accordingly, the CIS 2 is capable of capturing the motion of the subject at a moment desired by the user in the motions of the subject, even when the user's operation for starting high speed imaging is too early.

In addition, when the image obtained by high speed imaging is to be displayed on the display operation unit 4, the CIS 2 outputs the image data from the memory 6 to the communication I/F 32 of the AP 3 via the communication I/F 7 of the CIS 2 (step S6).

With this operation, by displaying the image data captured by high speed imaging input from the CIS 2 on the display operation unit 4 at a frame rate lower than an imaging rate, the AP 3 is capable of performing super slow playback of the image that has captured the motion of the subject at a moment desired by the user in the motions of the subject.

3. Specific Example of High Speed Captured Image

Next, a specific example of the high speed captured image according to the present disclosure will be described. Here, a case where a user attempts to capture a subject at a moment of contact in hitting a ball with a baseball bat will be described. Furthermore, here, high speed imaging as a comparative example that does not perform image data erasure by the image selection unit 8 will be described first, and then, high speed imaging that performs image data erasure by the image selection unit 8 will be described.

Figure 3:
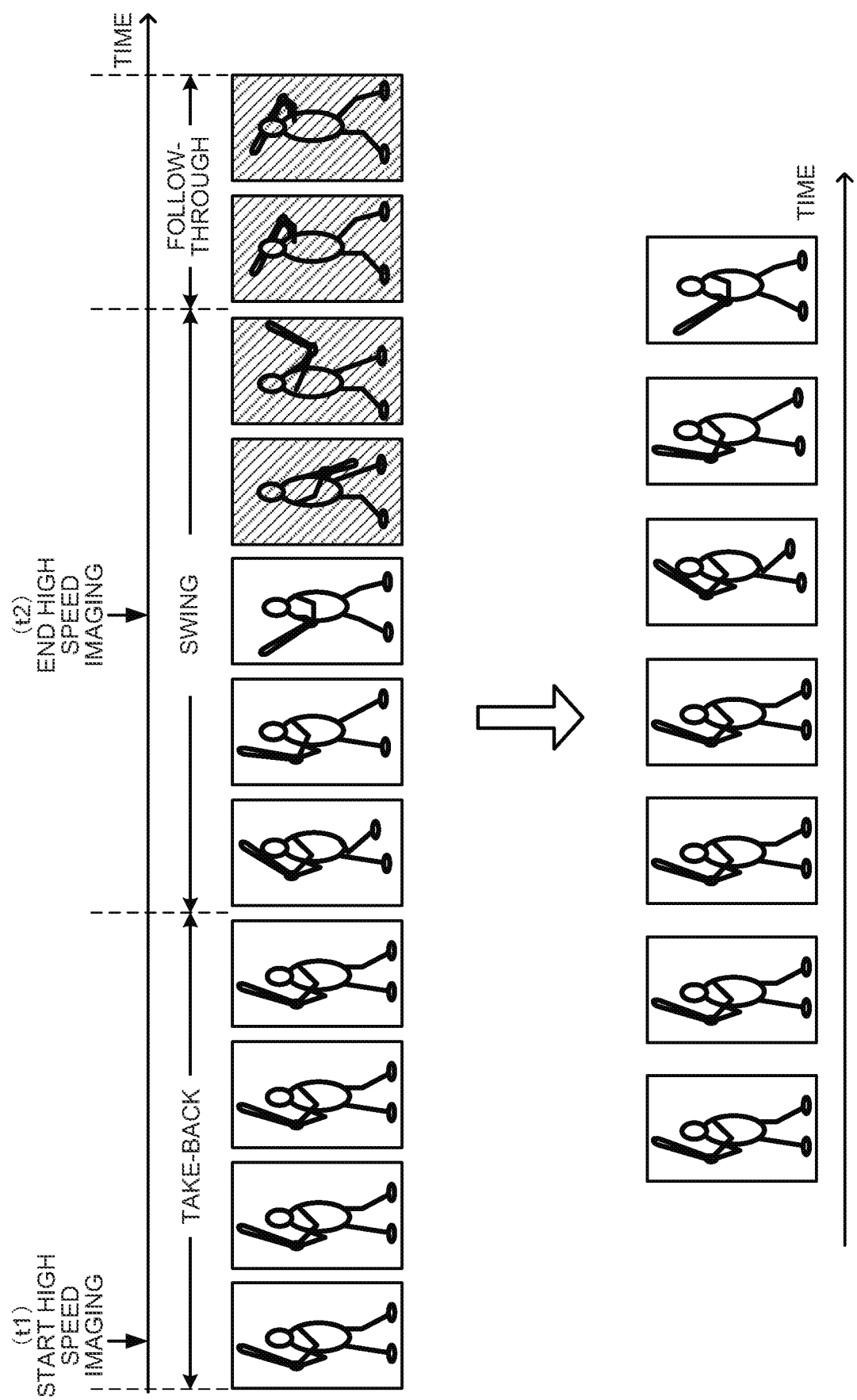
FIG. 3 is a diagram illustrating a high speed captured image according to a comparative example of the present disclosure.
Figure 4:
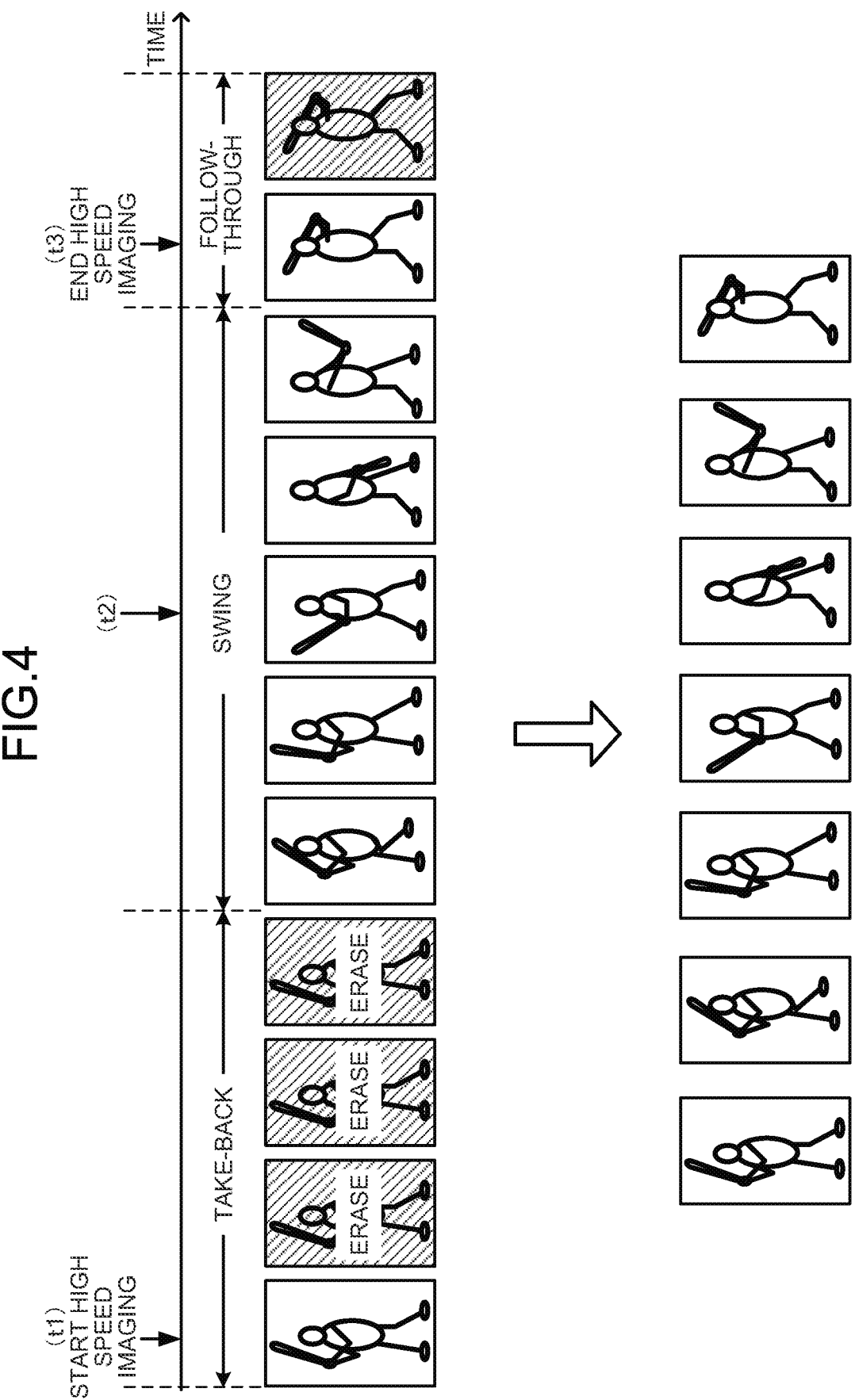
FIG. 4 is a diagram illustrating a high speed captured image according to the present disclosure.

FIG. 3 is a diagram illustrating a high speed captured image according to the comparative example of the present disclosure. FIG. 4 is a diagram illustrating a high speed captured image according to the present disclosure. Here, in order to facilitate understanding of the effects of the image selection unit 8, the number of image frames that can be stored in the memory 6 is described as seven frames, which is extremely smaller than the actual possible number.

As illustrated in the upper part of FIG. 3, the action of swinging a baseball bat includes a series of motions of take-back, swing, and follow-through. For example, when erasure of the image by the image selection unit 8 is not performed, the CIS 2 starts high speed imaging at time t1 and ends the high speed imaging at time t2, at a point of capturing the image of the seventh frame.

When playback of the high speed captured image captured in this manner is performed at super slow rate, the playback image is mostly an image of the subject being during take-back motion, as illustrated in the lower part of FIG. 3, and does not include the images during the swing and the moment of contact, which are desired by the user.

In contrast, the procedure in the case of performing erasure of images by the image selection unit 8 is, as illustrated in the upper part of FIG. 4, such that, after an image of the first frame is captured at time t1, the image selection unit 8 erases take-back images of second to fourth frames in which the amount of motion of the subject is less than a predetermined amount of motion.

The memory 6 has only stored one frame of image at this point, and thus, is capable of storing the remaining six frames of images. Since the subject enters the swing motion from the fifth frame, the amount of motion of the subject is a predetermined amount of motion or more. Accordingly, the image selection unit 8 stores the images of fifth to tenth frames in the memory 6 without erasing them, finishing the high speed imaging at time t3.

When playback of the high speed captured image captured in this manner is performed at a super slow mode, the playback image includes the images from the start to the end of the swing as illustrated in the lower part of FIG. 4, including the moment of contact desired by the user.

The playback images illustrated in the lower part of FIG. 4 are images obtained by thinning images of second to fourth frames, and thus, strictly speaking, the images are not super slow images that accurately express the actual motions of the subject. Still, the thinned second to fourth frame images are images including substantially no motion of the subject, and thus are not images in a period requiring high speed imaging.

Therefore, the playback images illustrated in the lower part of FIG. 4 are considered to be images that have achieved the intention of high speed imaging from the user's point of view, and are sensed by the user to be super slow images with extended imaging time. In this manner, according to the CIS 2, even when the user's operation of starting high speed imaging is too early, it is possible to image the motion of the subject at a moment desired by the user in the motions of the subject.

4. Relationship Between Amount of Motion of Subject and Number of Images Stored in Memory Next, with reference to FIG. 5, a relationship between the amount of motion of the subject when the bat swing scene described with reference to FIGS. 3 and 4 is captured at a frame rate of 1000 fps, and the number of images stored in the memory 6, will be illustrated.

Figure 5:
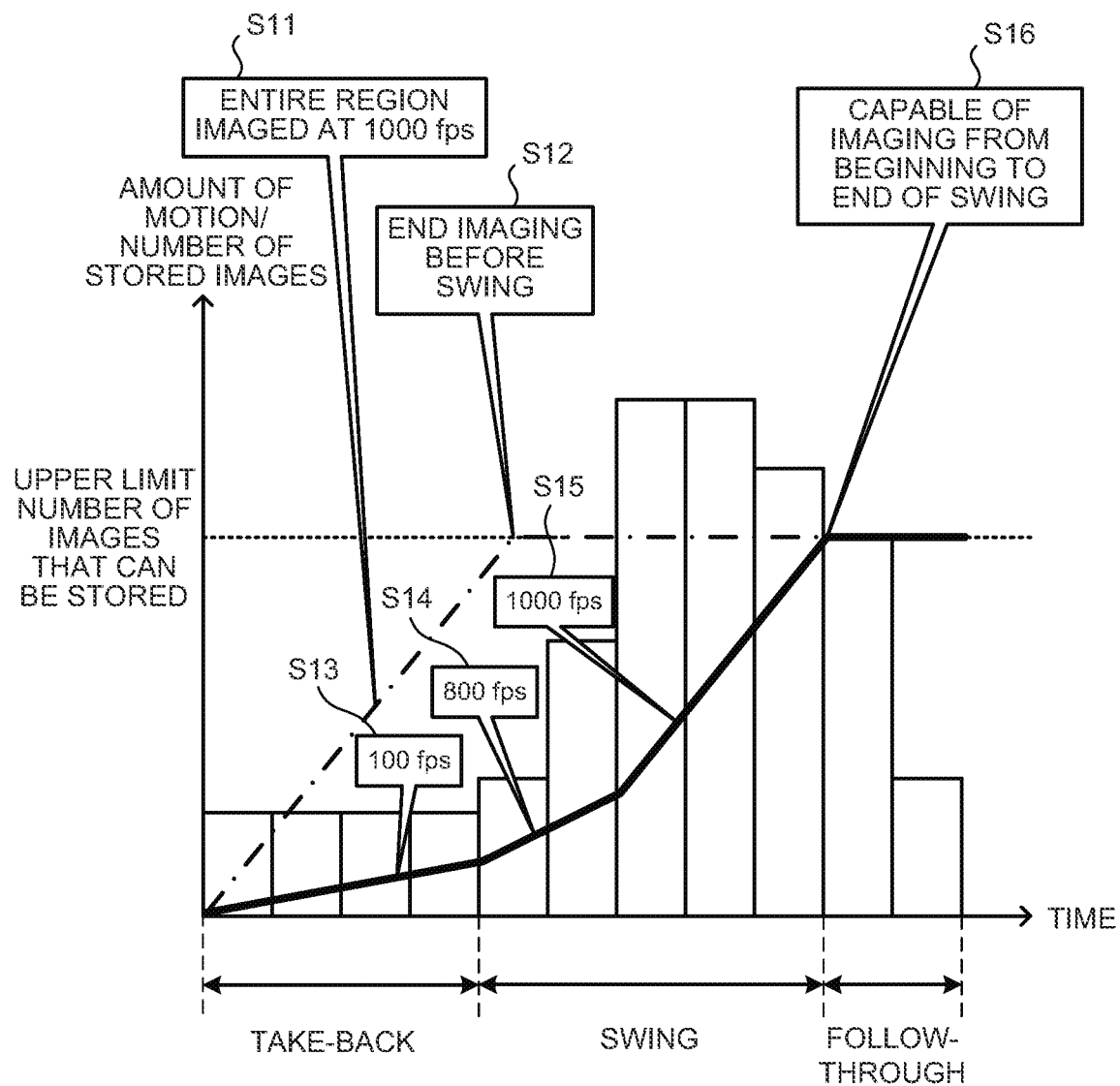
FIG. 5 is a diagram illustrating a relationship between the amount of motion of a subject and the number of images stored in a memory according to the present disclosure.

FIG. 5 is a diagram illustrating a relationship between the amount of motion of a subject and the number of images stored in a memory according to the present disclosure. In FIG. 5, the horizontal axis represents time, and the vertical axis represents the amount of motion of the subject and the number of stored images. Furthermore, in FIG. 5, the magnitude of the amount of motion of the subject in each of time zones is illustrated by a bar graph.

Furthermore, the solid line graph illustrated in FIG. 5 illustrates the number of images to be stored in the memory 6 when the image is erased by the image selection unit 8. Furthermore, the line graph in one-dot chain line in FIG. 5 illustrates the number of images to be stored in the memory 6 when the image is not erased by the image selection unit 8.

When the entire regions of the bat swing motions are imaged at 1000 fps without erasing images, as illustrated in the line graph of one-dot chain line in FIG. 5 (step S11), the number of captured images reaches the upper limit of the number of images that can be stored in the memory 6 before the swing starts, and this ends the imaging (step S12).

In contrast, in a case of erasing images, an image in which the amount of motion of the subject is less than a predetermined amount during take-back is to be erased as illustrated in the solid line graph in FIG. 5, and therefore, an image of 100 fps will be stored in the memory 6 even when imaging is performed at 1000 fps (step S13).

Thereafter, when the swing is started, the amount of motion of the subject gradually increases, and thus, an image of 800 fps will be stored in the memory 6 (step S14). At the contact with the ball where the amount of motion is maximized, an image of 1000 fps will be stored in the memory 6 (step S15). As a result, according to the CIS 2, imaging is possible for all the motions of the beginning to the end of the swing (step S16).

5. Process Executed by Image Selection Unit

Figure 6:
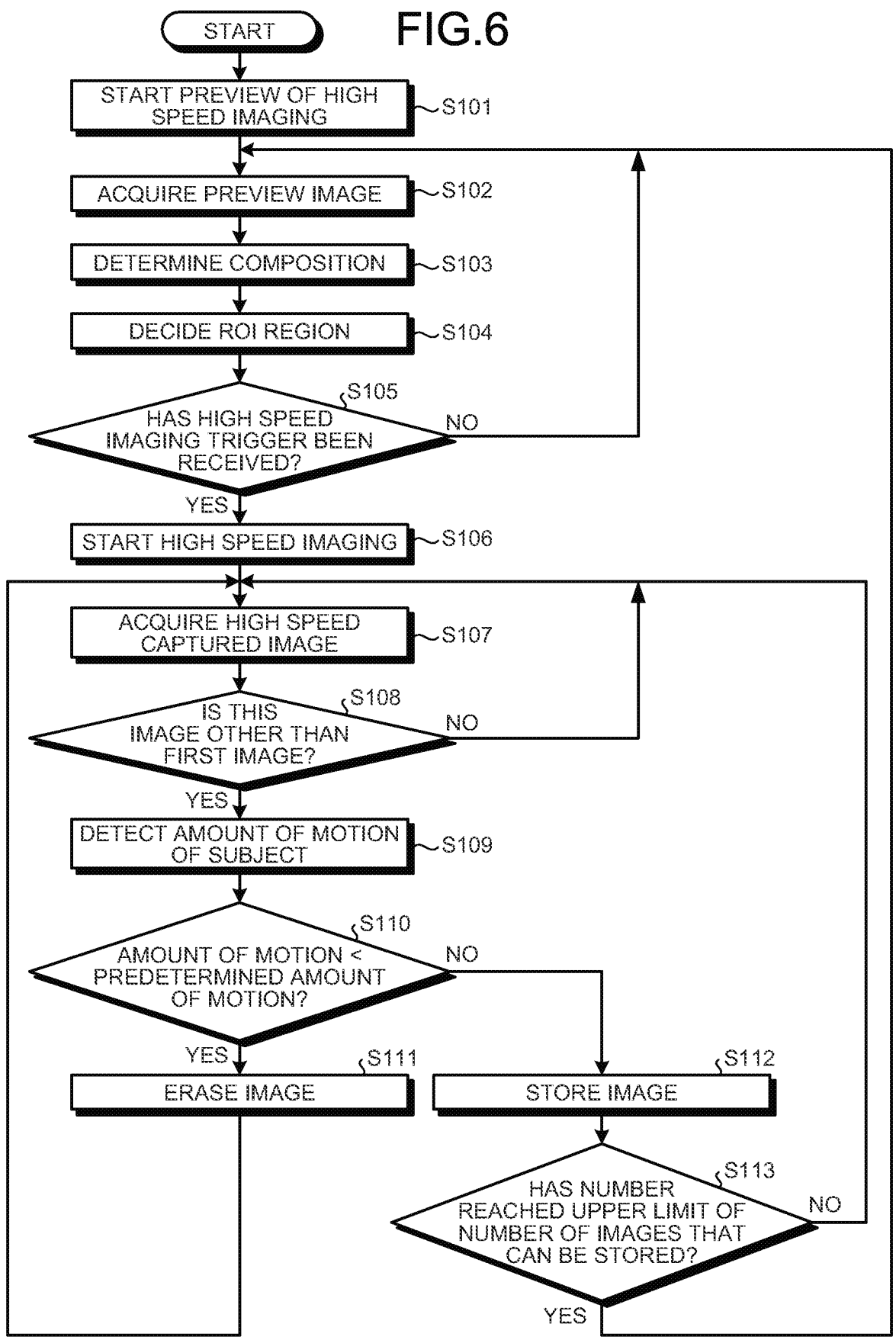
FIG. 6 is a flowchart illustrating an example of processes executed by the CIS according to the present disclosure.

Next, an example of the process executed by the CIS 2 according to the present disclosure will be described with reference to FIG. 6. FIG. 6 is a flowchart illustrating an example of processes executed by the CIS 2 according to the present disclosure.

The CIS 2 continuously executes the process illustrated in FIG. 6 while the electronic device 1 is in the high speed imaging mode. Specifically, in the CIS 2, when the electronic device enters the high speed imaging mode, the imaging unit 5 first starts high speed imaging preview as illustrated in FIG. 6 (step S101). Here, the imaging unit 5 captures a preview image at a lower speed than the high speed imaging.

Subsequently, the image selection unit 8 acquires the preview image (step S102), determines the composition of the image (step S103), and decides the ROI region (step S104). Thereafter, the imaging unit 5 determines whether a high speed imaging trigger has been received (step S105).

Then, when the imaging unit 5 determines that the high speed imaging trigger has not been received (step S105, No), the imaging unit 5 proceeds to the process of step S102. Furthermore, when the imaging unit 5 determines that the high speed imaging trigger has been received (step S105, Yes), the imaging unit 5 starts high speed imaging (step S106).

Thereafter, the image selection unit 8 acquires a high speed captured image (step S107), and determines whether the acquired high speed captured image is an image other than the first image (step S108). When the image selection unit 8 determines that the image is the first image (step S108, No), the process proceeds to step S107.

When the image selection unit 8 determines that the image is an image other than the first image (step S108, Yes), the image selection unit 8 detects the amount of motion of the subject in the ROI region (step S109). The image selection unit 8 then determines whether the amount of motion is less than a predetermined amount of motion (step S110).

When having determined that the amount of motion is less than the predetermined amount of motion (step S120, Yes), the image selection unit 8 erases the image (step S111), and proceeds to the process of step S107. In contrast, when having determined that the amount of motion is not less than the predetermined amount of motion, that is, the amount of motion is the predetermined amount of motion or more (steps S110, No), the image selection unit 8 stores the image in the memory 6 (step S112).

Subsequently, the image selection unit 8 determines whether the number of images stored in the memory 6 has reached the upper limit of the number of images that can be stored in the memory 6 (step S113). When the image selection unit 8 determines that the upper limit of the number of images that can be stored has not been reached (steps S113, No), the process proceeds to step S107.

When the image selection unit 8 determines that the upper limit of the number of images that can be stored has been reached (steps S113, Yes), the process proceeds to step S102. The CIS 2 continuously executes the above series of processes while the electronic device 1 is in the high speed imaging mode.

6. Other Embodiments

The processes according to each of embodiments described above may be performed in various different forms (modifications) in addition to each of the embodiments described above.

For example, although the above-described embodiment is an exemplary case where there is one moving object in the captured image, the specifying unit 81 can also specify a moving object that the user is likely to desire to image as a subject in the presence of a plurality of moving objects in a captured image.

For example, a camera user is likely to fit the subject to be imaged in the center of the image. Therefore, the specifying unit 81 specifies an object in the center of the image, as a subject. With this operation, in the presence of a plurality of moving objects in the captured image, the specifying unit 81 can specify a moving object that the user is likely to desire to image, as the subject.

In addition, the specifying unit 81 specifies an object selected from the image by the user, as a subject. In such a case, the specifying unit 81 specifies, for example, an object selected by a touch operation by the user, as a subject in the preview image displayed on the display operation unit 4. With this operation, the specifying unit 81 can specify the moving object as a subject even when the moving object that the user desires to image is captured at a position other than the center of the image, for example.

Note that the specifying unit 81 can also exclude an object selected from the image by the user, from the target to be specified as the subject. With this configuration, when the subject automatically specified by the specifying unit 81 is not the object intended by the user, the user can exclude the object from the target to be specified by the specifying unit 81 as a subject by performing an operation of selecting the specified object displayed on the display operation unit 4.

In addition, usually, when the AF function is operating, the user of the camera generally does not release the shutter until the desired object for imaging is in focus. Therefore, when the AF function is operating, the specifying unit 81 specifies the object closest to the autofocus point as a subject. With this operation, the specifying unit 81 is capable of specifying a moving object that the user is likely to desire to image, as a subject.

Furthermore, the CIS 2 can include a storage unit that stores image data of an object to be specified as a subject by the specifying unit 81. In such a case, the CIS 2 allows the user to preliminarily register and store the image data of the person's face or object as a candidate for the subject in the storage unit.

The specifying unit 81 then specifies the subject based on the image data stored in the storage unit. For example, the specifying unit 81 acquires a feature amount of each of divided regions obtained by dividing a captured image, calculates a score indicating the similarity between the feature amount acquired from the captured image and the feature amount of the image data stored in the storage to specify the object in the divided regions with a high score, as the subject. With this operation, the specifying unit 81 can specify an object whose image data is likely to have been pre-registered by the user, as the subject.

Furthermore, the CIS 2 has a plurality of modes in which the type of the object to be specified as a subject is mutually different. The specifying unit 81 specifies an object according to the mode, as a subject. For example, the specifying unit 81 specifies only a person as the subject when a sports mode is selected by the user, and registers only an animal as the subject when an animal mode is selected. This enables the specifying unit 81 to specify an arbitrary object included in the type desired by the user, rather than a specific object, as the subject.

In addition, the specifying unit 81 can also be provided with artificial intelligence (AI) that estimates an object that is likely to move in a captured image. In such a case, the specifying unit 81 specifies an object judged by the AI to be most likely to move, as a subject. With this configuration, the specifying unit 81 can specify an object that is likely to move that the user desires to image, as the subject even when the user does not select a mode or specify an object.

Furthermore, when the image contains a plurality of persons, the specifying unit 81 decides a person to be specified as the subject based on at least one of the age or gender of the photographed person. For example, the specifying unit 81 decides a person to be specified as the subject, with a high priority for children, a medium priority for women, and a low priority for men. The priority setting for age and gender can be changed arbitrarily. With this configuration, the specifying unit 81 can specify a person according to the preference of the user, as the subject.

Furthermore, in general, a user who desires to capture a big moment of a subject tends to place the subject within the angle of view even before starting high speed imaging. In view of this, the specifying unit 81 specifies an object that is continuously present in the preview image for a predetermined time or longer, as a subject. With this operation, the specifying unit 81 can specify a moving object that the user is likely to desire to image at a big moment, as the subject.

While the above-described embodiment is a case where the CIS 2 includes the specifying unit 81, the specifying unit 81 may be provided on the AP 3 side. In such a case, the CIS 2 outputs the image stored in the memory 6 to the AP 3, acquires the subject specified by the specifying unit 81 provided in the AP 3 from the AP 3, and selects the image data to be erased by a procedure similar to the above procedure.

However, when the specifying unit 81 is provided on the AP 3 side, it would be necessary to output all the image data stored in the memory 6 to the AP 3, increasing the power consumption of the CIS 2. In view of this, it is desirable to provide the specifying unit 81 on the CIS 2 side.

The processing procedures, control procedures, specific names, and information including various data and parameters illustrated in the above specifications or drawings can be changed in any manner unless otherwise specified. In addition, the specific examples, distributions, numerical values or the like described in the examples are merely examples and can be arbitrarily changed.

In addition, each of components of each of devices is provided as a functional and conceptional illustration and thus does not necessarily need to be physically configured as illustrated. That is, the specific form of distribution/integration of each of devices is not limited to those illustrated in the drawings, and all or a part thereof may be functionally or physically distributed or integrated into arbitrary units according to various loads and use conditions. For example, the specifying unit 81, the detection unit 82, and the erasing unit 83 illustrated in FIG. 1 may be integrated.

Furthermore, the above-described embodiments and modifications can be appropriately combined within a range implementable without contradiction of processes.

7. Effects

The CIS 2 includes the imaging unit 5, the memory 6, the detection unit 82, and the erasing unit 83. The imaging unit 5 continuously captures images of a subject to generate image data. The memory 6 stores image data. The detection unit 82 detects the amount of motion of the subject based on the image data in time series. The erasing unit 83 erases image data in which the amount of motion of the subject is less than a predetermined amount of motion. With this configuration, for example, when performing high speed imaging, by erasing images having a small amount of motion between time-series images and not requiring high speed imaging to ensure free region in the memory 6, the CIS 2 is capable of capturing the motion of the subject at the moment desired by the user in the motions of the subject.

In addition, the CIS 2 includes the specifying unit 81. The specifying unit 81 specifies the subject in the image from the image data. The detection unit 82 detects the amount of motion of the subject specified by the specifying unit 81. For example, in a case where the specifying unit 81 is provided outside the CIS 2, the CIS 2 would need to output image data to the external specifying unit 81, which increases power consumption. Fortunately, however, with this configuration that internally includes the specifying unit 81, it is possible to reduce the power consumption.

Moreover, the specifying unit 81 specifies a subject from image data of a preview image captured by the imaging unit 5 before the high speed imaging performed by the imaging unit 5 is started. With this operation, the detection unit 82 can detect the amount of motion of the subject immediately after the start of high speed imaging.

In addition, the specifying unit 81 determines the composition of the image by DNN processing using a DNN, and decides a ROI region in which the subject is captured, based on the composition. The detection unit 82 detects the amount of motion of the subject in the ROI region. With this configuration, the detection unit 82 can detect the accurate amount of motion of the subject.

In addition, the specifying unit 81 specifies an object in the center of the image as a subject. With this operation, in the presence of a plurality of moving objects in the captured image, the specifying unit 81 can specify a moving object that the user is likely to desire to image, as the subject.

In addition, the specifying unit 81 specifies an object selected from the image by the user, as a subject. With this configuration, the specifying unit 81 can specify the moving object as the subject even when the moving object that the user desires to image is captured at a position other than the center of the image.

In addition, the specifying unit 81 excludes an object selected from the image by the user from the target to be specified as the subject. With this procedure, the specifying unit 81 can exclude the automatically specified subject from the subject candidates when the automatically specified subject is not an object intended by the user.

In addition, the specifying unit 81 specifies an object close to the focus point of autofocus, as a subject. With this procedure, the specifying unit 81 can specify a moving object likely to be desired by the user who starts high speed imaging, as the subject, when the object comes in focus.

Furthermore, the CIS 2 includes a storage unit that stores image data of an object to be specified as a subject by the specifying unit 81. The specifying unit 81 specifies the subject based on the image data stored in the storage unit. With this operation, the specifying unit 81 can specify an object whose image data is likely to have been pre-registered by the user, as the subject.

In addition, the CIS 2 has a plurality of modes in which the type of the object to be specified as a subject by the specifying unit 81 is mutually different. The specifying unit 81 specifies an object according to the mode, as the subject. This enables the specifying unit 81 to specify an arbitrary object included in the type desired by the user, rather than a specific object, as the subject.

In addition, the specifying unit 81 specifies an object that is judged to be likely to move in the image by artificial intelligence, as a subject. With this configuration, the specifying unit 81 can specify an object that is likely to move that the user desires to image, as the subject even when the user does not select a mode or specify an object.

Furthermore, when the image contains a plurality of persons, the specifying unit 81 decides the person to be specified as a subject based on age and/or gender of the person. With this configuration, the specifying unit 81 can specify a person according to the preference of the user, as the subject.

Moreover, the specifying unit 81 specifies an object that is continuously present for a predetermined time or more in a preview image captured by the imaging unit 5 before the high speed imaging performed by the imaging unit 5 is started, as a subject. With this operation, the specifying unit 81 can specify a moving object that the user is likely to desire to image at a big moment, as the subject.

Furthermore, the electronic device 1 includes the CIS 2. The CIS 2 includes the imaging unit 5, the memory 6, the detection unit 82, and the erasing unit 83. The imaging unit 5 continuously captures images of a subject to generate image data. The memory 6 stores image data. The detection unit 82 detects the amount of motion of the subject based on the image data in time series. The erasing unit 83 erases image data in which the amount of motion of the subject is less than a predetermined amount of motion. With this configuration, for example, when performing high speed imaging, by erasing images having a small amount of motion between time-series images and not requiring high speed imaging to ensure free region in the memory 6, the electronic device 1 is capable of capturing the motion of the subject at the moment desired by the user in the motions of the subject.

In addition, the CIS 2 continuously captures images of a subject to generate image data, stores the image data in the memory 6, detects the amount of motion of the subject based on the image data in time series, and erases the image data in which the amount of motion of the subject is less than a predetermined amount of motion. With this operation, the CIS 2 can capture the motion of the subject at the moment desired by the user in the motions of the subject.

The effects described in the present specification are merely examples, and thus, there may be other effects, not limited to the exemplified effects.

Note that the present technology can also have the following configurations.

(1)

An imaging device including:
an imaging unit that continuously captures images of a subject to generate image data;
a memory that stores the image data;
a detection unit that detects an amount of motion of the subject based on the image data in time series; and
an erasing unit that erases the image data in which the amount of motion of the subject is less than a predetermined amount of motion.

(2)

The imaging device according to (1), further including a specifying unit that specifies a subject in the image based on the image data,
wherein the detection unit
detects the amount of motion of the subject specified by the specifying unit.

(3)

The imaging device according to (2),
wherein the specifying unit
specifies the subject based on image data of a preview image captured by the imaging unit before high speed imaging performed by the imaging unit is started.

(4)

The imaging device according to (2) or (3),
wherein the specifying unit
determines a composition of an image by using Deep Neural Network (DNN) processing that using a DNN, and then decides a Region of Interest (ROI) region in which the subject is imaged, from the composition, and
the detection unit
detects the amount of motion of the subject in the ROI region.

(5)
  The imaging device according to any one of (2) to (4), wherein the specifying unit
  specifies an object in a center of the image, as a subject.
(6)
  The imaging device according to any one of (2) to (5), wherein the specifying unit
  specifies an object selected from the image by a user, as the subject.
(7)
  The imaging device according to any one of (2) to (6), wherein the specifying unit
  excludes an object selected from the image by a user, from a target to be specified as the subject.
(8)
  The imaging device according to any one of (2) to (7), wherein the specifying unit
  specifies an object close to a focus point of autofocus, as a subject.
(9)
  The imaging device according to any one of (2) to (8), further including
  a storage unit that stores image data of an object to be specified as the subject by the specifying unit,
  wherein the specifying unit
  specifies a subject based on the image data stored in the storage unit.
(10)
  The imaging device according to any one of (2) to (9), wherein the imaging device has a plurality of modes in which a type of an object to be specified as a subject by the specifying unit is mutually different, and
  the specifying unit
  specifies an object according to the mode as a subject.
(11)
  The imaging device according to any one of (2) to (10), wherein the specifying unit
  specifies an object that is judged to be likely to move in the image by artificial intelligence, as a subject.
(12)
  The imaging device according to any one of (2) to (11), wherein, when the image contains a plurality of persons, the specifying unit
  decides the person to be specified as a subject based on age and/or gender of the person.
(13)
  The imaging device according to any one of (2) to (12), wherein the specifying unit
  specifies an object that is continuously present for a predetermined time or more in a preview image captured by the imaging unit before high speed imaging performed by the imaging unit is started, as a subject.
(14)
  An electronic device comprising:
  an imaging unit that continuously captures images of a subject to generate image data;
  a memory that stores the image data;
  a detection unit that detects an amount of motion of the subject based on the image data in time series; and
  an erasing unit that erases the image data in which the amount of motion of the subject is less than a predetermined amount of motion.

(15)
  An imaging method including:
  continuously capturing images of a subject to generate image data;
  storing the image data in a memory;
  detecting an amount of motion of the subject based on the image data in time series; and
  erasing the image data in which an amount of motion of the subject is less than a predetermined amount of motion.

REFERENCE SIGNS LIST

1 ELECTRONIC DEVICE
2 CIS
3 AP
31 AP CONTROL UNIT
32 COMMUNICATION I/F
4 DISPLAY OPERATION UNIT
5 IMAGING UNIT
51 LIGHT RECEIVING UNIT
52 READOUT UNIT
6 MEMORY
7 COMMUNICATION I/F
8 IMAGE SELECTION UNIT
81 SPECIFYING UNIT
82 DETECTION UNIT
83 ERASING UNIT

The invention claimed is:

1. An imaging device, comprising:
  circuitry configured to:
    continuously capture images of a subject to generate image data;
    store the image data;
    determine a composition of an image based on Deep Neural Network (DNN) processing;
    determine a Region of Interest (ROI) region in which the subject is imaged, from the composition;
    determine a position of the determined ROI region in the image in which the subject is imaged;
    detect an amount of motion of the subject in the ROI region; and
    erase the image data based on the detected amount of motion in the ROI region is less than a specific amount of motion.

2. The imaging device according to claim 1, wherein the circuitry is further configured to;
  specify the subject in the image based on the image data; and
  detect the amount of motion of the specified subject.

3. The imaging device according to claim 2, wherein the circuitry is further configured to specify the subject based on image data of a preview image captured before high speed imaging is started.

4. The imaging device according to claim 2, wherein the circuitry is further configured to specify an object in a center of the image, as the subject.

5. The imaging device according to claim 2, wherein the circuitry is further configured to specify an object selected from the image by a user, as the subject.

6. The imaging device according to claim 2, wherein the circuitry is further configured to exclude an object selected from the image by a user, from a target to be specified as the subject.

7. The imaging device according to claim 2, wherein the circuitry is further configured to specify an object close to a focus point of autofocus, as the subject.

8. The imaging device according to claim 2, wherein the circuitry is further configured to:
   store image data of an object to be specified as the subject; and
   specify the subject based on the stored image data.

9. The imaging device according to claim 2, wherein
   the imaging device has a plurality of modes in which a type of an object to be specified as the subject is mutually different, and
   the circuitry is further configured to specify the object based on a mode, of the plurality of modes, as the subject.

10. The imaging device according to claim 2,
    wherein the circuitry is further configured to specify an object that is judged to move in the image by artificial intelligence, as the subject.

11. The imaging device according to claim 2,
    wherein, based on the image that contains a plurality of persons, the circuitry is further configured to determine a person, of the plurality of persons, to be specified as the subject based on at least one of an age or a gender of the person.

12. The imaging device according to claim 2,
    wherein the circuitry is further configured to specify an object that is continuously present for a specific time or more in a preview image captured before high speed imaging is started, as the subject.

13. An electronic device, comprising:
    an imaging device that comprises circuitry configured to:
    continuously capture images of a subject to generate image data;
    store the image data;
    determine a composition of an image based on Deep Neural Network (DNN) processing;
    determine a Region of Interest (ROI) region in which the subject is imaged, from the composition;
    determine a position of the determined ROI region in the image in which the subject is imaged;
    detect an amount of motion of the subject in the ROI region; and
    erase the image data based on the detected amount of motion in the ROI region is less than a specific amount of motion.

14. An imaging method, comprising:
    continuously capturing images of a subject to generate image data;
    storing the image data;
    determining a composition of an image by using based on Deep Neural Network (DNN) processing;
    determining a Region of Interest (ROI) region in which the subject is imaged, from the composition;
    determining a position of the determined ROI region in the image in which the subject is imaged;
    detecting an amount of motion of the subject in the ROI region; and
    erasing the image data based on the detected amount of motion in the ROI region is less than a specific amount of motion.

* * * * *